Figure 1:
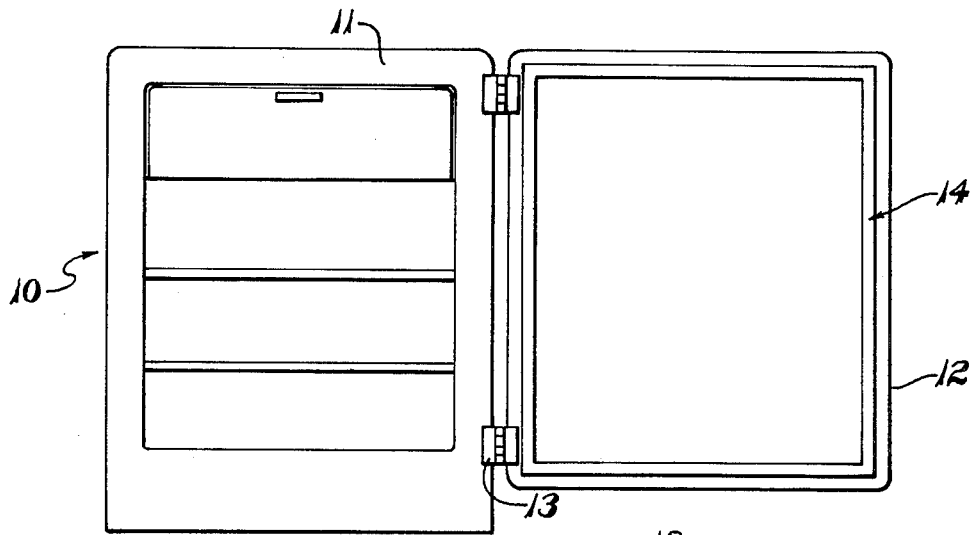

June 30, 1964  R. C. NEUMAN  3,138,833
RESILIENT GASKET
Filed June 21, 1962

INVENTOR.
RICHARD C. NEUMAN
BY W. A. Shira, Jr.
ATTY.

United States Patent Office 3,138,833
Patented June 30, 1964

3,138,833
RESILIENT GASKET
Richard C. Neuman, Marietta, Ohio, assignor to The
B. F. Goodrich Company, New York, N.Y., a corporation of New York
Filed June 21, 1962, Ser. No. 204,294
5 Claims. (Cl. 20—69)

This invention relates to resilient gaskets of the type adapted to effect a seal between two members, one of which provides a closure for an opening in the other. More particularly, the invention relates to resilient, magnet-containing gaskets for refrigerator and similar cabinets.

Refrigerators, especially those of the type used in the home, employ a gasket or sealing means between the door and the body of the cabinet to cushion the door in closing, to prevent the passage of air when the door is closed, and to provide a heat-insulating barrier in this region. Similar gaskets may be provided for the doors of cabinets other than refrigerators and for slidable drawers employed in refrigerators or other cabinets.

Gaskets of the type mentioned are formed of resilient flexible material, such as rubber, synthetic plastics, or other elastomeric material which have rubber-like properties, so that the gaskets can deform somewhat to provide the requisite seal between the cabinet and closure member even though there be irregularities in the surfaces of these members. In recent years, the gasket has been provided with a permanent magnet which is attracted to the steel or other magnetically attractable material of the cabinet when the door is placed adjacent thereto in closing position. Hence, the gasket now provides both the sealing action and the closure retention or latching action.

Magnet-containing gaskets heretofore employed in refrigerator and similar cabinets have normally been provided with a compartment for the magnet which is connected to the base of the gasket by corrugated or bellows-like portions of sufficient dimensions to provide for substantial movement of the magnet relative to the attaching portion of the gasket. Such gaskets have been subject to damage by cracking or splitting of the bellows-like walls as the result of repeated folding. Moreover, the space between the door and cabinet has been large enough to invite insertion of the fingers by one seeking to open the door with consequent potential damage of the gasket by the fingernails. In addition, the provision of side walls of such large dimensions has led to complications in forming of the gaskets.

In accordance with this invention, an important resilient, magnet-containing gasket of the type adapted for use in refrigerator and like cabinets is provided which is of simpler construction than those heretofore employed and provides for adequate "reach out," or movement of the magnet-containing compartment relative to the gasket base without, however, excessively large side walls between the magnet-containing compartment and the attaching base. Furthermore, the requisite "reach out" is provided with greater lateral stability of the gasket and in a manner which reduces potential damage to the gasket while improving the appearance of the cabinet. This is achieved by so forming the gasket that the inner walls of the magnet compartment are directly connected to the gasket base thus constituting a single cell design in contrast to the multiple cell or compartment designs of prior constructions thereby simplifying the equipment necessary for producing the gaskets and facilitating the operations of splicing mitered portions of the gasket to form a peripherally continuous unit.

Figure 2:
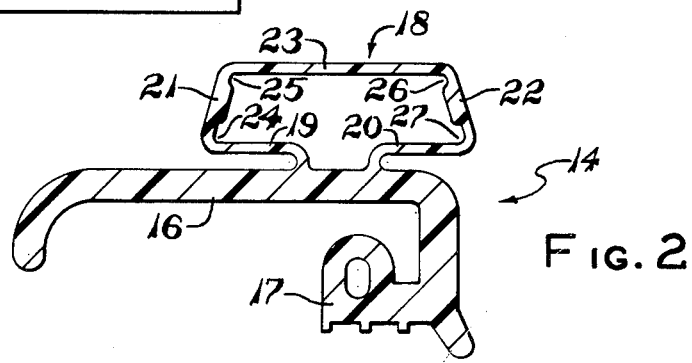
Figure 3:
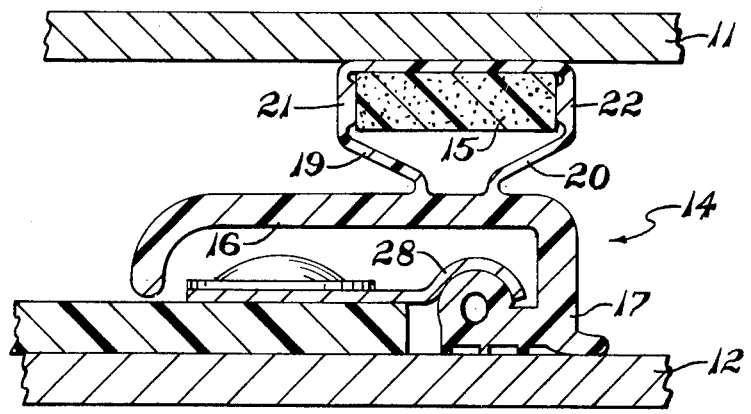

Further novel features and advantages of the invention will be apparent to those skilled in the art to which it pertains from the following description of the presently preferred embodiment thereof described with reference to the accompanying drawing, forming a part of this application, and in which:

FIG. 1 is a front elevational view of a refrigerator cabinet with the door in open position and provided with a magnet-containing gasket embodying this invention;

FIG. 2 is an enlarged transverse sectional view through the gasket per se in its undeflected condition; and FIG. 3 is a fragmentary, transverse sectional view through the improved gasket as it appears in position between the door and cabinet with the door held in closed position by the magnet in the gasket and with the gasket deformed as the result of the magnetic attraction between the door and the magnet in the gasket.

A refrigerator 10 of conventional construction is illustrated in FIG. 1 as comprising a cabinet member 11 providing a storage compartment the opening of which is closable by a door member 12 that is swingably mounted on the cabinet by hinges 13. The cabinet and door contain magnetically attractable material since the shell of both of these members is formed of sheet iron or steel. The opening to the storage compartment is sealed when the door is closed by a gasket member 14 which is here shown as a peripherally continuous unit mounted upon the door 12 in a substantially rectangular configuration with reaches of the gasket adapted to extend along each side of the cabinet opening when the door is closed.

The gasket 14 performs the dual function of a door seal and a latch. This is achieved by providing one or more reaches of the gasket with a permanent magnet 15. In the preferred embodiment the permanent magnet 15 extends as a single continuous length longitudinally of a reach of the gasket with the magnet being provided in strip form and flexible transversely of its length. Such magnets are now known in the art and hence need not be described in detail. It is sufficient here to note that such a magnet may be provided, on the face thereof disposed adjacent the cabinet 11 when the door is in closed position, with a plurality of magnetic poles in any desired configuration to thereby attract the metal of the cabinet 11 and hold the door in closed and sealed relationship when the door is disposed adjacent the cabinet. Complete sealing of the space between the cabinet and door in the closed condition of the latter is made possible by the flexible nature of the gasket and magnet which permit them to accommodate to irregularities of the door and cabinet members.

The gasket 14 is formed by extruding resilient flexible material, such as rubber, synthetic plastic, or other elastomeric materials as a continuous strip. As thus formed, the gasket comprises an elongated base portion 16 which is adapted to overlie a part of the member on which it is to be mounted. One edge of the base portion 16 is provided with an integral attaching portion 17 which has a configuration suitable for cooperation with the attaching means employed in the cabinet with which it is to be utilized. It will be understood that the attaching portion 17 does not, per se, constitute a feature of this invention and may have a configuration of any suitable type of which a number are now well known with the illustrated configuration being but one example.

The surface of the gasket base portion 16, opposite the side thereof provided with the attaching portion 17, has attached thereto an integral longitudinally extending hollow body or compartment 18. This body includes a pair of inner walls 19 and 20 the adjacent edges of which are integrally connected to the base portion 16 in laterally spaced relationship with the inner walls extending away from each other and substantially parallel to the base portion in undeflected condition of the gasket. The outer edges of the inner walls 19 and 20 are integrally connected with the lower edges of side walls 21 and 22, respectively. The side walls 21 and 22 are non-parallel and extend obliquely from the inner walls 19 and 20 in slightly converging relationship with the outer edge portions of these walls integrally connected to the edge portions of the outer wall 23 of the compartment 18. The wall 23 is generally parallel with the base portion 16 and, together with the side and base walls, forms a generally trapezoid-shaped compartment adapted to receive the elongated permanent magnet 15 which is preferably generally rectangular in cross section as shown in FIG. 3.

Preferably, the inner walls 19 and 20 are of thinner cross section than the side walls 21 and 22 and base portion 16 with substantially semi-cylindrical grooves 24, 25, 26 and 27 provided, respectively, at the intersections of the side walls with the inner and outer walls. These grooves extend longitudinally of the gasket in parallel relationship and provide regions of flexure for a purpose hereinafter described.

A gasket strip of the type illustrated in FIG. 2 is cut in appropriate lengths for forming the reaches of a peripherally continuous gasket and at least one of these lengths is provided with an elongated strip of flexible magnetic material 15. The other reaches of the gasket may have the hollow compartment thereof provided with deformable insulating material, such as fiberglass or the like. Preferably, however, only the reach of the gasket adjacent the hinges of the cabinet is provided with such deformable material and the other three reaches of the gasket each contain a strip of flexible magnetic material. The gasket lengths or reaches are united together in a single unit by heat sealing the adjacent edges of the gasket which have been bevel cut for this purpose as is now well understood in the art.

The gasket is then mounted upon one of the two members between which it is to provide sealing cooperation as, for example, upon the door member 12. This attachment of the gasket to the door member may be effected by known expedients as, for example, by the attaching strip 28 which engages the attaching portion 17 of the gasket beneath the base portion 16 as shown in FIG. 3.

The dimensions of the flexible magnetic strip 15 are preferably such that its width and thickness are slightly less than the corresponding width and thickness of the interior of the hollow body or compartment 18 when the latter is in undeflected condition. By way of example but without limitation thereto, the magnetic strip may have a width of 0.375 inch and a thickness of 0.129 inch when provided in a gasket whose interior of the compartment 18 has a transverse dimension, between the inner faces of the side walls 21 and 22 adjacent their upper edges, in the order of 0.400 inch and a thickness, measured between the inner surfaces of the outer and inner walls, of 0.134 inch.

The resulting space between the magnet 15 and the adjacent inner surfaces of the walls of the hollow compartment are not sufficient to cause undesirable displacement of the magnet in the gasket while providing for a positive limiting of the extent of "reach out" or deformation of the gasket in extending between the door and the cabinet when the door is in closed position. Thus, as the door 12 is moved to cabinet closing position, the attraction between the magnets within the gasket and the cabinet holds the door in closed position substantially as indicated in FIG. 3. As shown in this figure, the inner walls 19 and 20 of the magnet-containing compartment 18 have been deflected from their positions substantially parallel with the base portion 16 to positions extending obliquely with respect thereto while the side walls 21 and 22 have been moved into generally parallel relationship. This movement of the side and inner walls is facilitated by the aforementioned semi-cylindrical grooves 24, 25, 26 and 27 providing the regions of greater flexibility of the gasket, the extent of "reach out" of the gasket being limited by the abutment of the thickened side wall portions with the sides of the flexible magnet 15.

It will be apparent, therefore, that this construction provides for a sufficient "reach out" or deformation of the gasket to effect adequate sealing and holding of the door without, however, resulting in an excessive space between the door and cabinet members. Moreover, this "reach out" is positively limited to a predetermined amount, determined by the dimensions selected for the magnet strip and the compartment in which it is housed, so that the door cannot partake of appreciable inward and outward movement without breaking the sealing relationship as has been characteristic of gaskets of prior constructions and which gaskets have been subject to the aforementioned effects of cracking, splitting and other injury. It will also be apparent that by providing the compartment for the magnet as a single body or cell, the lower walls of which provide the flexible connection to the base portion 16, the construction is of simpler design than those heretofore employed wherein the magnet-containing compartment is separate from the portions which form the connection between that compartment and the base portion. This facilitates extrusion with less defective material and less expense as well as facilitating the sealing of the mitered ends of the gasket strips to form peripherally complete units. Moreover, these advantages, and others which will be readily apparent, are achieved with improved appearance of the gasket per se and of the cabinet provided therewith.

The invention has been described with respect to one specific embodiment in which the magnet-containing compartment is of trapezoidal cross section with the greater dimension adjacent the base portion of the gasket. In this consrtuction both sides have been shown as diverging from the outer wall at equal angles and of equivalent dimensions. It will be evident, however, that the principle of the invention may be incorporated in gaskets wherein the sides of the magnet-containing compartment are not of equal dimension and hence do not diverge from the outer wall of the magnet-containing compartment at equal angles. Likewise, while the outer wall has been shown as generally parallel with the base portion, this wall may, in some installations, have a convex curvature or may have a slightly greater elevation in the center than adjacent either side edge with sloping planar portions between the center and the edges.

These and other modifications and adaptations of the construction shown and described, which will be readily apparent to those skilled in the art, are all considered as coming within the ambit of the invention. Hence, the invention is not to be considered as limited to the illustrated and described construction except as required by the spirit and scope of the appended claims.

Having thus described the invention, I claim:

1. A gasket comprising an integral body of flexible resilient material including an elongated strip-like base portion and an elongated hollow portion secured to said base portion in superposed relationship thereto, the said hollow portion including an outer wall normally parallel to said base portion and spaced therefrom, a pair of spaced side walls integrally connected respectively to the edges of said outer wall and extending toward said base portion in diverging relationship, and a pair of inner walls each integrally connected respectively to an inner edge of one of said side walls with the said inner walls extending toward each other generally parallel to said base portion and with the adjacent edges of said inner walls directly connected to said base portion by integral arcuate portions in spaced relationship to each other and to said side walls, the said side walls having a longitudinally extending groove on the inner side thereof at each of their connections to said outer and inner walls thereby predetermining regions of flexure of said hollow portion.

2. A magnet-containing gasket comprising an integral body of flexible resilient material including an elongated base portion and an elongated hollow portion secured to said base portion in superposed relationship thereto, the said hollow portion including an outer wall spaced from said base portion, a pair of spaced side walls integrally connected respectively to the edges of said outer wall and extending toward said base portion in diverging relationship, a pair of inner walls each integrally connected respectively to an inner edge of one of said side walls with the said inner walls extending toward each other generally parallel to said base portion and with the adjacent edges of said inner walls directly connected to said base portion by integral arcuate portions in spaced relationship to each other and to said side walls, and an elongated permanent magnet in said hollow portion with a clearance between the magnet and the said side walls in the undeflected condition of the gasket, the said side walls having predetermined regions of flexure extending longitudinally adjacent their connections to said outer and inner walls, whereby magnetic attraction of the said magnet by magnetically attractable material adjacent said outer wall causes said inner and side walls to deflect in directions which increase the spacing of said hollow portion from the base portion.

3. A magnet-containing gasket comprising an integral body of flexible resilient material including an elongated base portion and an elongated hollow portion secured to said base portion in superposed relationship thereto, the said hollow portion including an outer wall spaced from said base portion, a pair of spaced side walls integrally connected respectively to the edges of said outer wall and extending toward said base portion in diverging relationship, a pair of inner walls each integrally connected respectively to an inner edge of one of said side walls with the said inner walls extending toward each other generally parallel to said base portion and with the adjacent edges of said inner walls directly connected to said base portion by integral arcuate portions in spaced relationship to each other and to said side walls, and an elongated permanent magnet in said hollow portion, the width of said magnet being less than the interior width of said hollow portion and said side walls having predetermined regions of flexure extending longitudinally adjacent their connections to said outer and inner walls, whereby magnetic attraction of said magnet by magnetically attractable material adjacent said outer wall increases the spacing of said hollow portion from the base portion and draws said side walls into generally parallel relationship.

4. A magnet-containing gasket comprising an integral body of flexible resilient material including an elongated base portion and an elongated hollow portion secured to said base portion in superposed relationship thereto, the said hollow portion being generally trapezoidal in cross section and including an outer wall normally parallel to said base portion and spaced therefrom, a pair of spaced side walls integrally connected respectively to the edges of said outer wall and extending toward said base portion in diverging relationship, a pair of inner walls each integrally connected respectively to an inner edge of one of said side walls with the said inner walls extending toward each other generally parallel to said base portion and with the adjacent edges of said inner walls directly connected to said base portion by integral arcuate portions in spaced relationship to each other and to said side walls, and an elongated permanent magnet generally rectangular in cross section in said hollow portion with the width of said magnet less than the greatest interior width of said hollow portion, the inner surfaces of said side walls having grooves adjacent their connections to said outer and inner walls whereby magnetic attraction of the magnet by magnetically attractable material adjacent said outer wall increases the spacing of said hollow portion from the base portion and draws said side walls into generally parallel relationship.

5. A magnet-containing gasket adapted to be attached to one member for sealing cooperation as a peripherally continuous unit of generally rectangular configuration about an opening in another member which has magnetically attractable material adjacent said opening, said gasket comprising an elongated body of resilient flexible material including an elongated base portion adapted to be attached to and overlie a part of said one member and an elongated hollow portion secured to said base portion in superposed relationship, the said hollow portion including an outer wall spaced from said base portion, a pair of spaced side walls integrally connected respectively to the edges of said outer wall and extending toward said base portion in diverging relationship, a pair of inner walls each integrally connected respectively to an inner edge of said side walls with the said inner walls extending toward each other generally parallel to said base portion and with the adjacent edges of said inner walls directly connected to said base portion by integral arcuate portions in spaced relationship to each other and to said side walls, and an elongated flexible permanent magnet generally rectangular in cross section extending as a single continuous strip in said hollow portion on at least one side of the said peripherally continuous gasket unit, the said side walls of the hollow portion having predetermined regions of flexure extending longitudinally thereof adjacent their connections to said outer and inner walls whereby attraction of said magnet by the magnetically attractable material of the said other member increases the spacing of said hollow portion from said base portion and moves said side walls toward each other.

References Cited in the file of this patent
UNITED STATES PATENTS

| | | |
|---|---|---|
| 2,659,118 | Anderson et al. | Nov. 17, 1953 |
| 2,899,721 | Herman | Aug. 18, 1959 |
| 3,048,902 | Hastings et al. | Aug. 14, 1962 |